(12) United States Patent
Abel et al.

(10) Patent No.: US 9,719,294 B2
(45) Date of Patent: Aug. 1, 2017

(54) VOTING MULTI-CART

(71) Applicants: Gary V. Abel, Ellicott City, MD (US); Joseph Wilson, Spencer, WV (US)

(72) Inventors: Gary V. Abel, Ellicott City, MD (US); Joseph Wilson, Spencer, WV (US)

(*) Notice: Subject to any disclaimer, the term of this patent is extended or adjusted under 35 U.S.C. 154(b) by 0 days.

(21) Appl. No.: 14/739,949

(22) Filed: Jun. 15, 2015

(65) Prior Publication Data
US 2015/0298716 A1    Oct. 22, 2015

Related U.S. Application Data

(60) Continuation-in-part of application No. 13/350,186, filed on Jan. 13, 2012, now Pat. No. 9,058,708, which is a continuation-in-part of application No. 13/323,117, filed on Dec. 12, 2011, now Pat. No. 8,474,834, which is a division of application No. 12/380,738, filed on Mar. 3, 2009, now Pat. No. 8,075,004, which is a continuation-in-part of application No. 11/899,333, filed on Sep. 5, 2007, now Pat. No. 7,654,457.

(60) Provisional application No. 62/103,189, filed on Jan. 14, 2015.

(51) Int. Cl.
| B62B 3/14 | (2006.01) |
| E06B 9/24 | (2006.01) |
| G07C 13/02 | (2006.01) |
| B62B 3/02 | (2006.01) |
| B62B 3/10 | (2006.01) |

(52) U.S. Cl.
CPC .............. *E06B 9/24* (2013.01); *G07C 13/02* (2013.01); *B62B 3/02* (2013.01); *B62B 3/10* (2013.01)

(58) Field of Classification Search
CPC .............................. B62B 2207/02; B62B 3/14
See application file for complete search history.

(56) References Cited

U.S. PATENT DOCUMENTS

| 2005/0212233 A1* | 9/2005 | Hall ........................ B62B 3/02 280/33.991 |
| 2008/0302585 A1* | 12/2008 | Perelli .................... B62B 3/008 180/14.1 |
| 2012/0031510 A1* | 2/2012 | Weissenbach ........... B01L 9/54 137/343 |
| 2012/0223501 A1* | 9/2012 | Benoit ................. B62B 5/0079 280/204 |

* cited by examiner

*Primary Examiner* — Bryan Evans
(74) *Attorney, Agent, or Firm* — Baker Donelson, PC; Royal W. Craig

(57) ABSTRACT

A multi-compartmentalized utility cart for storage, transport and or deployment of a complete VVPB station inclusive of two private voting stations for generating paper ballots (one being ADA-compliant), plus it private VVPB tabulation station all without moving the equipment off the utility cart. The cart includes multiple on-board deployable privacy curtains attached to the cart at each station to enclose a voter standing or seated in front of the voting terminal or ballot box.

15 Claims, 7 Drawing Sheets

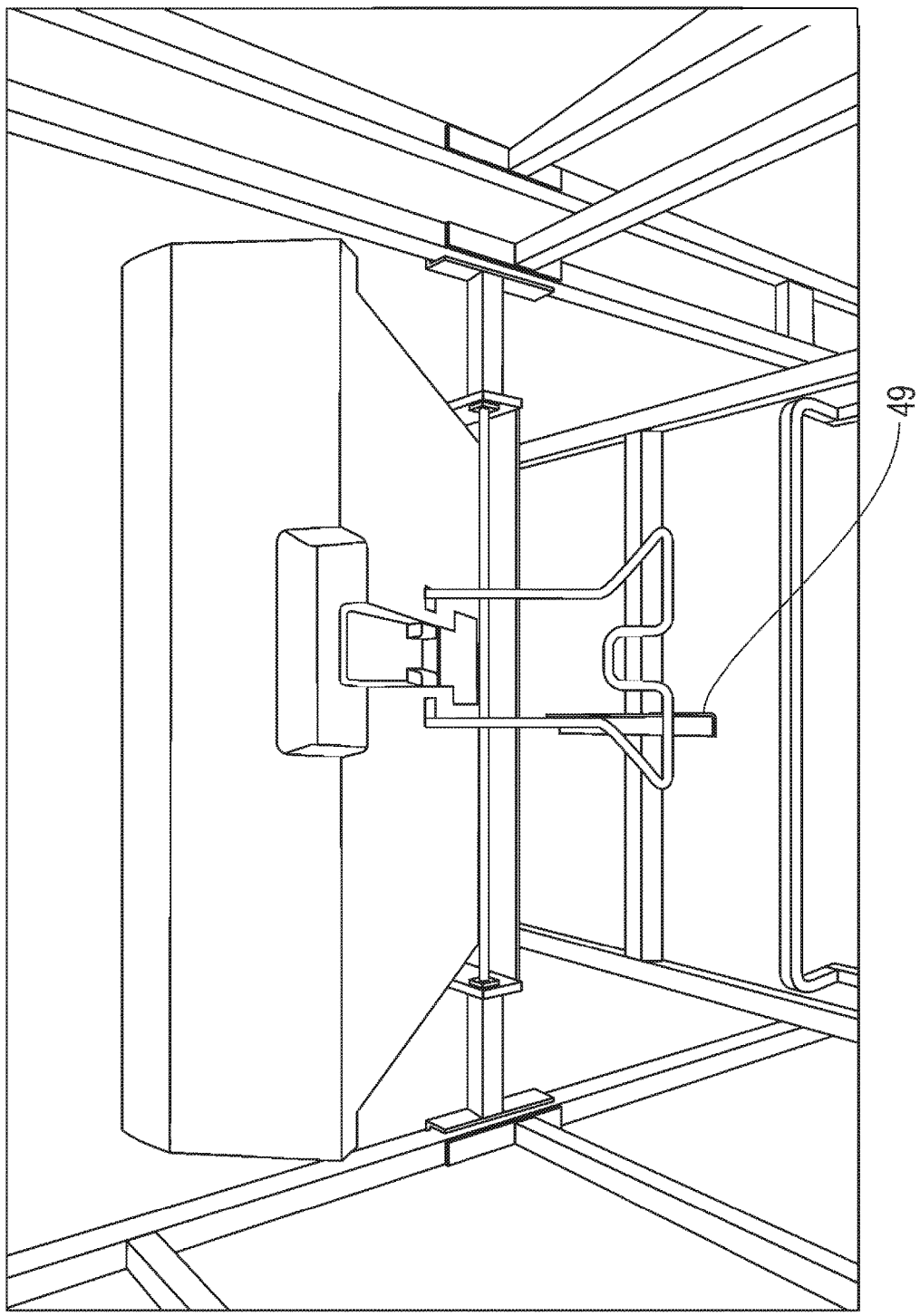

VOTING MULTI-CART

CROSS-REFERENCE TO RELATED APPLICATION(S)

The present application derives priority from New U.S. Provisional Patent Application 62/103,189 filed Jan. 14, 2015, and is a continuation-in-part of U.S. patent application Ser. No. 13/350,186 filed Jan. 13, 2012, which is a continuation-in-part of U.S. patent application Ser. No. 13/323,117 filed Dec. 12, 2011, which is a divisional of application Ser. No. 12/380,738 filed Mar. 3, 2009, which is a continuation in pan of application Ser. No. 11/899,333 filed Sep. 5, 2007.

BACKGROUND a. Field of Invention

The invention relates to utility carts for voting equipment and, more particularly, to a specially-adapted multi-compartmentalized utility cart for storage, transport and or deployment of all voting equipment needed to create an optimal Voter Verified Paper Ballot (VVPB) station inclusive of two private voting stations for generating paper ballots (one being ADA-compliant) plus a private VVPB tabulation station all without moving the equipment off the utility cart.

b. Background of the Invention

Due to the infrequent nature of public elections voting equipment is kept in storage at each voting precinct, and at elections, utility carts are used for transporting the equipment from storage to a public, forum, and vice versa after the election. Voting machines are valuable electronic devices and are extremely heavy. Thus, a very robust utility cart is required to carry such devices. Still, elderly election officials often experience great difficulty in moving the voting equipment on and off the utility carts. The present inventor provided a partial solution to the problem in his co-pending U.S. patent application Ser. No. 13/350,186 filed Jan. 13, 2012. This application described a voter cart with on-board deployable privacy curtain suspended from articulating support members pivotally attached to the cart. When deployed the privacy curtain suspends itself around a tall substantially enclosed area in from of a voting terminal seated in the cart, and encloses a voter standing in front of the voting terminal. This renders the terminal ready to use by the voter without ever removing the voting terminal from the cart, and so the terminal remains in the tamper-proof cart during voting as well as during transport and storage. However, there are a number of different types of balloting terminals that are used in either paper-based or electronic voting systems across the United States.

Many precincts are now moving toward a paper-based voting system, in particular, a Voter Verified Paper Ballot (VVPB) system station inclusive of touch terminal voting stations for generating punched or printed paper ballots, in combination with a ballot box tabulation station for counting the paper ballots.

These ballot box tabulation stations typically include both a ballot tabulation unit either permanently or temporarily secured to one or more ballot boxes. The ballot box and/or the ballot tabulation unit/ballot box combination may be expandable or collapsible and may come with additional accessories or features that alter its size and/or weight, such as batteries, locking mechanisms, varying types of privacy screens, tables, and specialty equipment to assist disabled persons in using the balloting terminal. As an example of one type of voting machine, Castro & Harris manufactures the ES&S Model M100 Ballot Counter, a high-speed central paper ballot counter which, when combined with a ballot box, is approximately the size if a large computer server (approximately 2.5'×2'×4.5') and weighs approximately 20 lbs. By contrast, electronic balloting systems such as the AccuVote®-TSX distributed by Premier Election Solutions™ is roughly 1×2'×4" in its un-deployed form and approximately 26 lbs. Some electronic balloting systems may also require stands to hold them in an upright position during voting.

Voters first use the VVPB terminals to generate paper ballots, then move to the ballot box tabulation station and teed in their ballots for counting. VVPB provides an effective paper trail by which to independently audit the election results. VVPB balloting systems additionally comprise a plurality of separate touch-screen ballot printers or manual ballot marking terminals, for example, to assist disabled voters in marking their paper ballots. An example of such a terminal is the ES&S AutoMARK voter assist terminal, which is 48 lbs and approximately 1.5'×2'×1', although the dimensions of these and other balloting units may change between storage and deployment. Typically in the paper balloting system, each precinct will also provide one or more special voting terminals for handicapped persons. For example, Castro & Harris, Inc. distributes the Auto-MARK™ voter assist terminal, a ballot-marking system designed to provide privacy and accessibility to voters who are blind, vision-impaired, or have a disability or condition that would make it difficult or impossible to mark a ballot with a typical paper ballot system. The AutoMARK terminal is sized at approximately 2'×1'×1.5', although the dimensions of this and other balloting units may change between storage and deployment, and weighs 4 lbs.

VVPB systems introduce logistical complexity inasmuch as what could be done with a single all-electronic voting terminal now takes both a voting terminal and a ballot box/tabulator. Adding to the complexity, the Americans with Disabilities Act (ADA) requires that people with disabilities can access and use their voting facilities. The ADA's regulations and the ADA Standards for Accessible Design prescribe that some of the VVPB voting terminals and some of the ballot box tabulation stations at any facility accommodate wheelchair voters at the polling place. ADA standards make it difficult to design a VVPB-compatible utility cart that keeps a terminal ready to use by the voter while still seated in a tamper-proof cart. Moreover, the present inventor has determined that a preferred VVPB station would include two private voting stations with VVPB terminals for generating paper ballots, one being ADA-compliant, plus a private VVPB ballot box tabulation station. On the other hand, voting occurs in a multitude of precincts, the number and locations of which are chosen to accommodate all eligible voters in a given geographic area. Therefore, the population of eligible voters in a given area, along with the types of voting technology available to that precinct, will determine how many and which types of voting equipment (including ballot counting devices, ballot boxes, ballot marking systems and accessories) will be needed for a given polling location. In urban areas, a single polling facility may be required to accommodate hundreds of voters or more, and therefore a considerable amount of voting equipment must be moved to that polling place. In addition, such as in less populated areas, a single polling place could be chosen to accommodate multiple voting precincts. In some cases, neighboring precincts served by a single polling place may utilize different ballot styles such that multiple types of voting equipment is required to accurately mark, count, and store the disparate ballots. The type, quantity, variety, and overall weight of the voting equipment needed to outfit a single polling place thus fluctuates widely between polling centers based on population density and other factors, and changes as voting technology evolves. Thus, some degree of modularity is required to adapt the optimal numbers of voting terminals and ballot box tabulators.

Voting equipment is at its most vulnerable during transportation and storage. Thus, all the loaded equipment must be fully restrained against lateral and vertical motion, and yet all equipment must preferably be given fill access to their control panels, doors, etc. Moreover, any transport cart design should keep weight to a minimum with a framework that is as light weight as possible. What is needed is a multi-compartmentalized cart with robust mechanical restraints to protect against shifting of the equipment and yet full frontal and side access to both pieces of equipment to allow access to the consoles.

It would be greatly advantageous to provide a multi-compartmentalized utility cart for storage, transport and or deployment of a complete VVPB station inclusive of two private voting stations for generating paper ballots (one being ADA-compliant), plus a private VVPB tabulation station all without moving the equipment off the utility cart. The present invention provides the foregoing complete with multiple on-board deployable privacy curtains attached to the cart each station to enclose a voter standing or seated in front of the voting terminal or ballot box. The cart also includes multiple reconfigurable shelves for the voting equipment, robust mechanical restraints to protect against shifting of the equipment, and yet provides full frontal and side access to each piece of equipment to allow easy off- and on-loading, all within a tamper-proof framework that is as light weight as possible without sacrificing stability and security. The design is modular to allow additional carts and or stations to be integrally attached.

SUMMARY OF THE INVENTION

It is, therefore, an object of the present invention to provide a storage and transport cart specifically adapted for VVPN voting terminals and ballot box tabulation equipment that incorporates multiple reconfigurable shelves for storing and transporting a variety of election equipment as required by various precincts such that the same cart can be utilized by multiple precincts and can adapt to transport and store technologically evolving voting machinery.

It is yet another object to provide a storage and transport cart as above that provides multiple on-board deployable privacy curtains attached to the cart at each station to enclose a voter standing or seated in front of the voting terminal or ballot box.

It is still another object to provide a storage and transport cart as above that provides robust mechanical restraints to protect against shifting of the equipment, and yet provides full frontal and side access to each piece of equipment to allow easy off- and on-loading.

It is still another object to provide a multi-shelf storage and transport cart with high-weight-bearing shelves capable of supporting multiple, e.g., touch-screen voting terminals such as the AutoMARK (vendor specifications indicate each weighs 48 pounds), central ballot counters such as the ES&S Model M100 (30 pounds), etc., which collective weights is significant with respect to delivery to and setup at the polling places.).

It is still another object to provide a storage and transport cart as above that maximizes strength and usability, and yet keeps weight to a minimum with a framework that is as light weight as possible, thereby allowing for safe handling of same by polling workers of all ages and physical abilities, even when fully laden with heavy voting equipment.

According to the present invention, the above-described and other objects are accomplished by providing a multi-compartmentalized utility cart for storage, transport and or deployment of a complete VVPB station inclusive of two private voting stations for generating paper ballots (one being ADA-compliant), plus a private VVPB tabulation station all without moving the equipment off the utility cart. The present invention provides the foregoing complete with multiple on-board deployable privacy curtains attached to the cart at each station to enclose a voter standing or seated in front of the voting terminal or ballot box.

The utility cart is capable of supporting two touch-screen VVPN voting terminals plus a separate ballot counter, all in a useable position and each surrounded by a collapsible privacy screen.

The cart is generally formed with a pair of opposing side-rails defined by contiguous tubing bent in a closed rectangular loop with one or more pairs of horizontal struts for supporting a suspended shelving unit, wherein the vertical distance between a shelving unit and the corresponding pair of horizontal struts is adjustable to allow for various combinations of differently sized voting equipment to alternately be stored thereon. The suspended shelves further increase the weight capacity of the shelving unit. Extended "bumpers" on the bottom edge of the cart help to prevent injuries to workers engaged in moving the carts and minimize the likelihood of large impacts to the equipment housed on the carts and the risk of injury to the persons moving said carts.

BRIEF DESCRIPTION OF THE DRAWINGS

Additional aspects of the present invention will become evident upon reviewing the embodiments described in the specification and the claims taken in conjunction with the accompanying figures, wherein like numerals designate like elements, and wherein:

FIG. 9 is an alternate embodiment of the articulating stand assembly 40 of FIG. 8.

DETAILED DESCRIPTION OF THE PREFERRED EMBODIMENT

The present invention is an adaptable utility can designed for storage and/or transport of multiple and various types of voting machines and accessory components in a convenient, safe and readily accessible manner.

Figure 1:
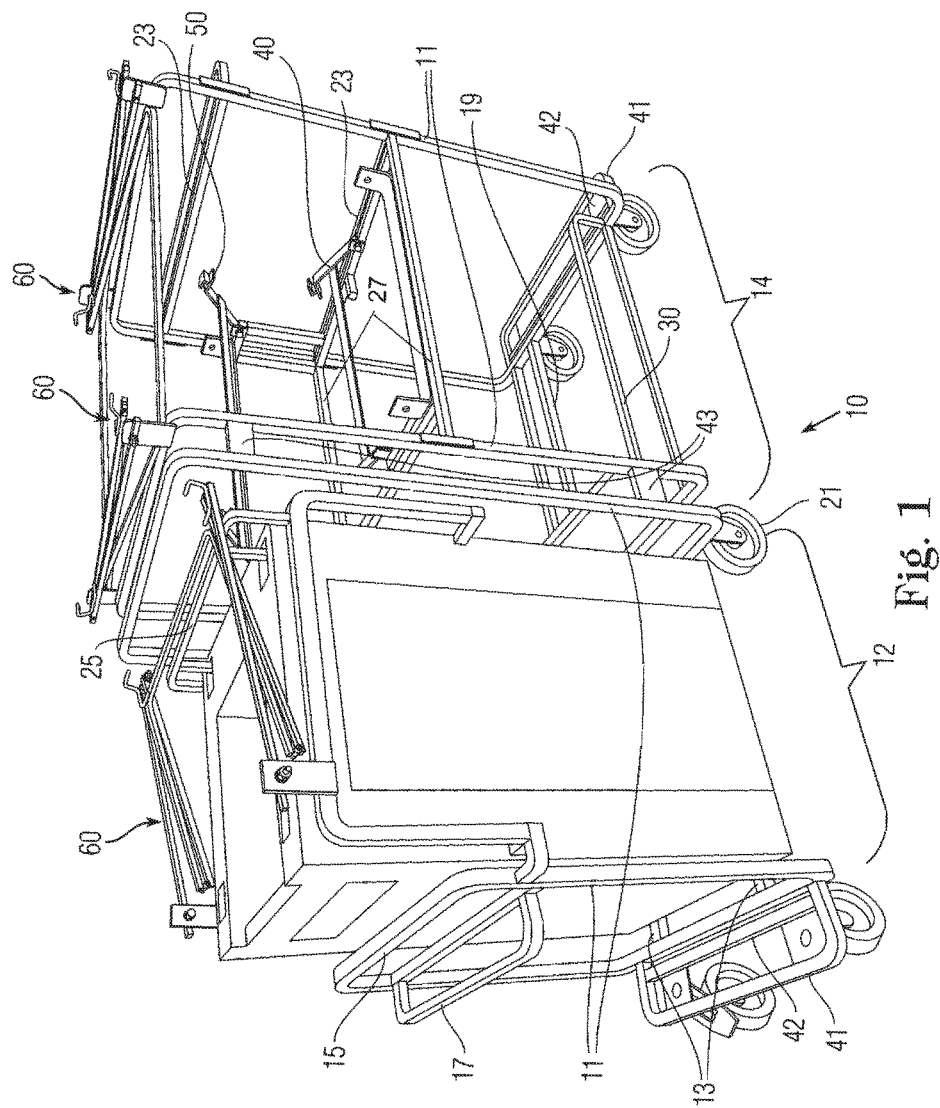
FIG. 1 is a front perspective view of the utility cart according to a first embodiment the present invention.
Figure 2:
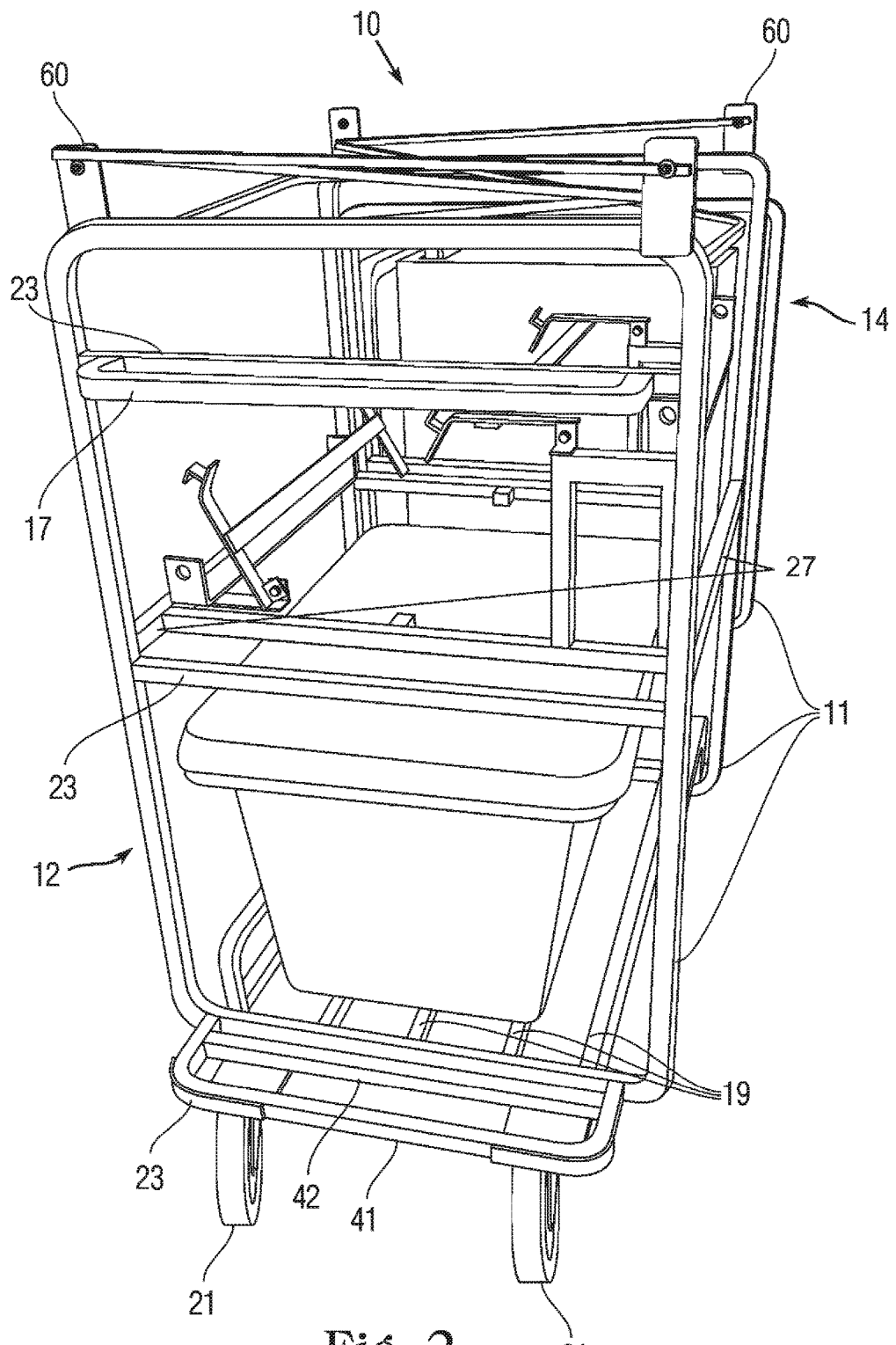
FIG. 2 is a side perspective view of voter cart 10 of FIG. 1.
Figure 3:
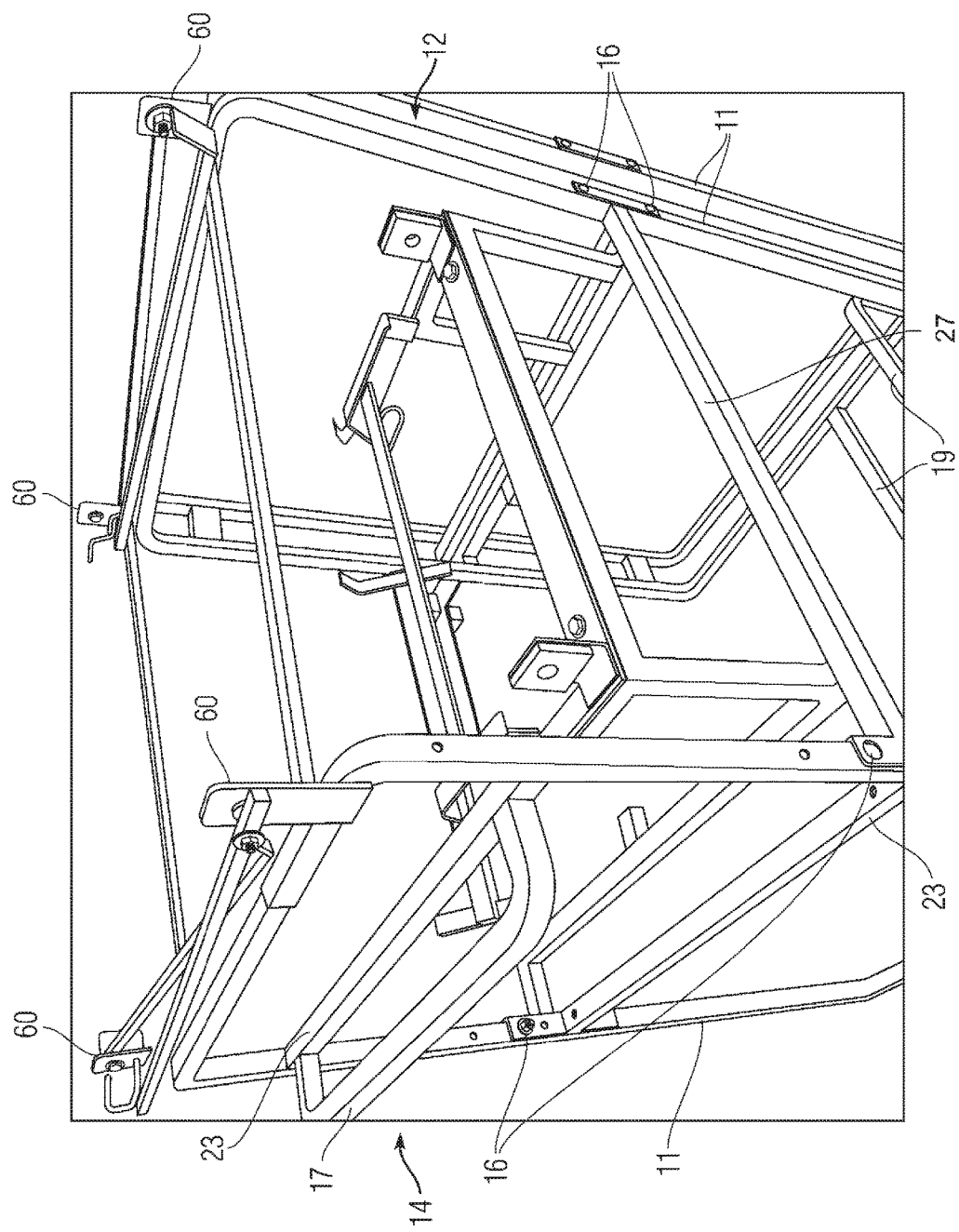
FIG. 3 is a rear perspective view.

FIG. 1 is a front perspective view of voter cart 10 according to an embodiment of the present invention. FIG. 2 is a side perspective view of voter cart 10 of FIG. 1. FIG. 3 is a rear perspective view.

With combined reference to FIGS. 1-1, the voter cart 10 generally comprises a ballot box enclosure 12 rigidly joined to a voting terminal enclosure 14.

Ballot box enclosure 12 includes an opposing pair of side-rail assemblies 11, one shorter than the other, bound together by a pair of horizontal semi-removable lower cross-struts 13 and a pair of U-shaped semi-removable upper cross-struts 15. Each side-rail 11 is formed from hollow tubular stock bent-and-welded into a continuous substantially rectangular shape with rounded corners. Each lower cross-strut 13 runs side-to-side from one side-rail 11 to another, and grips the side-rails via perpendicular yokes attached at the distal ends. The yokes are secured to the side-rails 11 by one-way tamperproof bolts 16 (see FIG. 3) which traverse the yokes and engage holes in the side-rails 11 to lock the cross-struts 13 in position. The pair of lower cross-struts 13 run underneath a ballot box counter seated thereupon, and suspend it up off the floor. The ballot box counter is maintained erect within the ballot box enclosure 12 by the U-shaped semi-removable upper cross-struts 15, which span the side-rails 13 in front and back of the ballot box. Each upper cross-strut 15 runs side-to-side from one side-rail 11 to another, and grips the side-rails via perpendicular yokes attached at the distal ends. The upper cross-struts 15 are likewise formed of tubular steel stock bent in the shape of an inverted "U" that protrudes upward following the edges of the ballot box for protection thereof. The ballot box counter may be secured in position within the ballot box enclosure 12 by a forked bracket 25 which spans the cross-struts 15 over the ballot box and includes a plurality of downwardly-projecting bosses that keyed into apertures in the ballot box. The forked bracket 25 runs side-to-side from one cross-strut 25 to another, and grips the side-rails via yokes attached at the distal ends. The yokes are secured to the cross-struts 15 by one-way tamperproof bolts 16 (see FIG. 3) which traverse the yokes and engage holes in the cross-struts 15.

The outermost (short) side-rail 11 is equipped with a bumper comprising a lateral U-shaped end rail 41 running parallel along the elongate width of cart 10 and a transverse end rail 42 straddling the U-shaped end rail 41 for maximum strength and protection. Both lateral end rails 41, 42 are formed from tubular stock with end rail 41 bent in a U-shape with rounded edges of approximately 3" radius. Transverse end rail 42 straddles the U-shaped end rail 41 as shown, and may be screwed or welded in place. The U-shaped end rail 41 is welded to side rails 11, and two wheel assemblies 21 are screwed to the rails 41, 42 at the corners. End rail 41 protrudes approximately 5" from the side rail 11 and adds bumper-protection and a wider wheel base. Its rounded corners may be adorned with plastic strips 23 to form optional bumper features as described herein. The two wheel assemblies 21 are heavy duty pivoting castor wheel assemblies 21 (preferably locking castors) for portability. Wheel assemblies 21 are attached at the corners of the rails 41, 42 to maximize wheelbase. Protruding from the upper-half of the outer side-rail 11 is an elongated U-shaped handle 17. Handle 17 protrudes approximately 4" from the side rails 11, leaving a full inch gap if end rail 41 impacts something. This provides a safe and secure place to position hands to push or pull the voter cart 10.

Voting terminal enclosure 14 sits adjacent the ballot box enclosure 12 and likewise includes an opposing pair of side-rail assemblies 11, at least one and preferably both being equal in height to the inner side rail 11 of ballot box enclosure 12. Side rails 11 are bound together by one horizontal semi-removable lower cross-struts 19 at the floor and a pair of semi-removable upper cross-struts 27 located at mid-height. Each side-rail 11 is likewise formed from hollow tubular stock bent-and-welded into a continuous substantially rectangular shape with rounded corners. The lower cross-strut 19 runs side-to-side from one side-rail 11 to another and grip the side-rails via perpendicular yokes attached at the distal ends as above, secured by one-way tamperproof bolts 16. The bottom front of the voting terminal enclosure 14 is shown in FIG. 1 to be blocked with a folding shelf 30 that folds up and back into a stowed position at the rear of the voting terminal enclosure 14 as will be described. When stowed, the folding shelf 30 leaves the forefront of the voting terminal enclosure 14 completely open to accommodate a wheelchair voter in a seated position. When deployed as shown, the folding shelf 30 provides additional storage space for transport and further reinforces the side rails 11.

A first voting terminal may be affixed to an articulating stand assembly 40 located mid-height in the voting terminal enclosure 14 for adjustable access at the forefront. Stand assembly 40 supports the first voting terminal in either a substantially horizontal position for standing voters or an upright-locked position for seated wheelchair voters, also as described below in detail.

A second voting terminal may be affixed atop a stationery stand assembly 50 located toward the top of the voting terminal enclosure 14 for fixed access from the rear of the voting terminal enclosure 14 by standing voters, as described below in detail.

Figure 8:
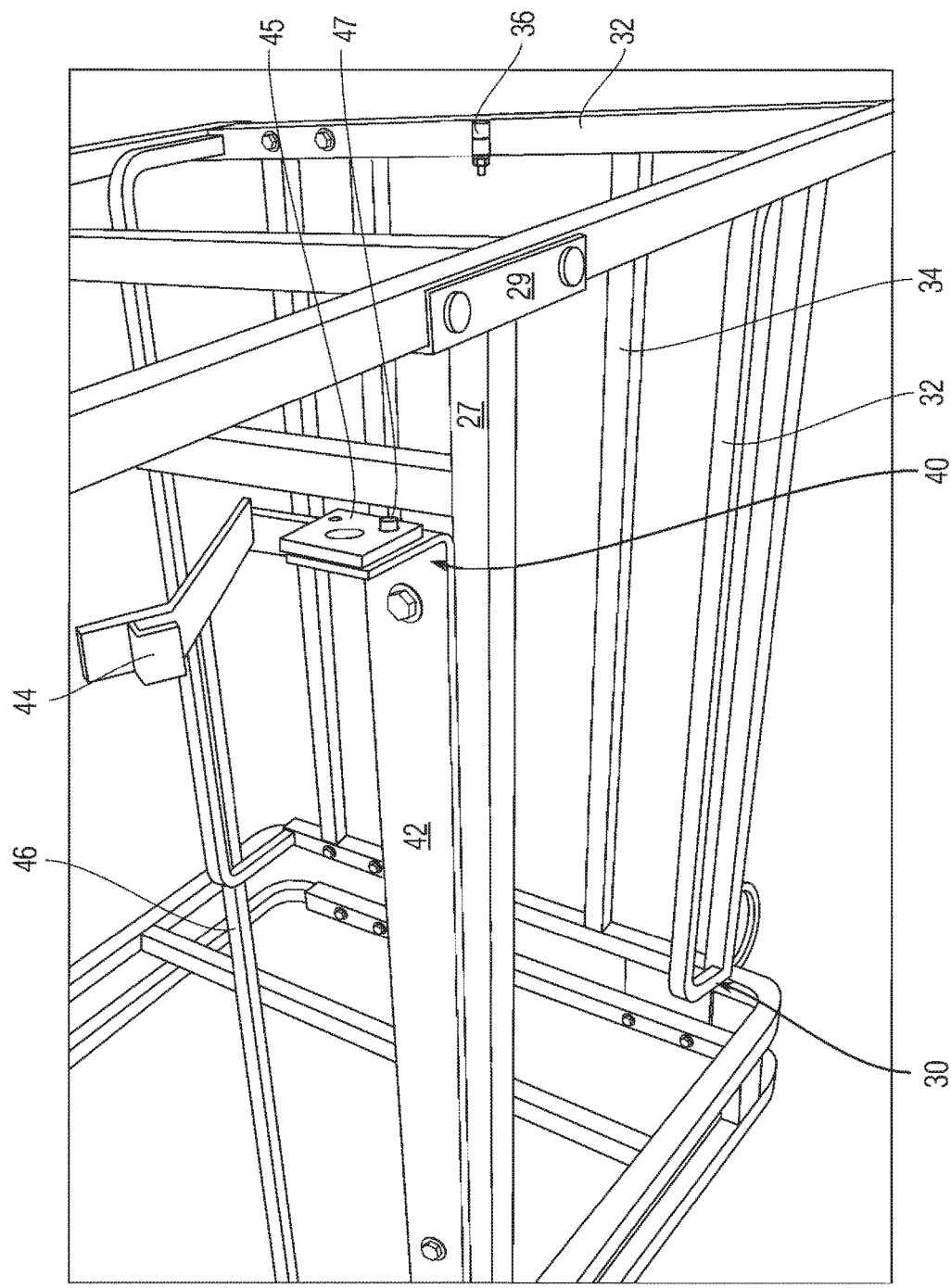
FIG. 8 also shows the articulating stand assembly 40 for adjustable access at the forefront on the voting terminal enclosure 14.

As best seen in FIG. 8, the mid-height semi-removable upper cross-struts 27 span the side-rails 11 in front and back of the voting terminal enclosure 14 gripping the side-rails 11 via perpendicular yokes attached at the distal ends. The yokes are secured by one-way tamperproof bolts 16. The upper cross-struts 27 on the voting terminal enclosure 14 side are straight lengths of tubular steel stock.

Optionally, the side-rails 11 of the voting terminal enclosure 14 may be reinforced by from-to-back struts 23 welded there across as shown in FIG. 2.

As above, the bottom of the outermost side-rail 11 is equipped with a bumper comprising a lateral U-shaped end rail 41 running parallel along the elongate width of cart 10 and a transverse end rail 42 straddling the U-shaped end rail 41 for maximum strength and protection. Two wheel assemblies 21 are screwed to the rails 41, 42 at the corners. End rail 41 protrudes approximately 5' from the side rail 11 and adds bumper-protection and a wider wheel base. Its rounded corners may be adorned with plastic strips 23 to form bumper features as described above.

Protruding from the upper-half of the side-rail 11 is an elongated U-shaped handle 17 (obscured in FIG. 1, see FIG. 2). Handle 17 protrudes approximately 4" from the side rails 11, leaving a full inch gap if end rail 41 impacts something. This provides a safe and secure place to position hands to push or pull the voter cart 10.

The innermost side rail 11 of the voting terminal enclosure 14 is affixed to the innermost side rail 11 of the ballot box enclosure 12 by four spacer plates 43 welded between the two side rails 11 proximate the corners. In addition, a third pair of wheel assemblies 21 is screwed between the innermost side rails 11 for bottom reinforcement.

All of the framework for the above-described is preferably formed of powder-coated tubular steel stock or aluminum tubing welded together. Handles 17 may be constructed of the same materials as those used for side rails 11 and affixed to side rails 11 by weldment, screw, nut and bolt or other known fastening means, importantly, handles 17 are identically-shaped to the end rails 41 and share the same rounded corners, but handles 17 are scaled roughly two-thirds the size of end rails 41. This way, end rails 41 protrude approximately one inch outward past handles 17 and protect handles 17, or more importantly protect any hands gripping handles 17.

It should now be apparent that the multi-compartmentalized utility cart 10 described above provides three separate voting, stations in a T-configuration: two private voting stations for generating paper ballots at the voting terminal enclosure 14 (the front one being selectively ADA-compliant); plus a private VVPB tabulation station at the ballot box enclosure 12 for depositing paper ballots. All three stations face each other. However, to ensure complete privacy each station is equipped with an on-board deployable privacy mechanism 60 attached to the side rails 11 of cart 10 to enclose a voter standing or seated in front of the voting terminal or ballot box. FIGS. 1-3 show the deployable privacy mechanisms 60 attached to the utility can 10 but with privacy curtains 65 removed to reveal their working components.

FIGS. 4-7 are sequential perspective views illustrating one of the three deployable privacy mechanisms 60 and its usage. Each deployable privacy mechanism 60 generally comprises an opposing pair of pivoting arms 62 attached at one end to pivot points 61 located at the upper front corners of side members 11, a U-shaped curtain support member 63 pivotally attached by its distal ends at pivot points 64 to the other ends of pivoting arms 62, and a fabric or synthetic privacy curtain 65 suspended at the top from the U-shaped curtain support member 63 and removably attached to the rear of the cart 10 such as at side members 11 or grab handle 50. Both of pivoting arms 62 are of length substantially equal to the front-to-back extent of cart 10, as is the U-shaped curtain support member 63. This way, when stowed, the pivoting arms 62 align with and fold flat against the upper extent of side members 11, as do the legs of U-shaped curtain support member 63. Consequently, these components 62, 63 fold accordion-style into the open top of the can 10. In the preferred embodiment, a pair of inwardly directed flanges 70 is attached by welding, or the like along the upper extent of side members 11 for cradling the arms 62 and curtain support member 62 when in their stowed position, flanges 70 are simple angle brackets that extend a lip inwardly to catch and seat the arms 52 and curtain support member 62, and as illustrated the lip of flanges 70 is preferably angled downward toward the rear of the ballot cart 10 to ensure that both arms 62 and curtain support member 63 rest submerged beneath the upper extent of side members 11.

Figure 5:
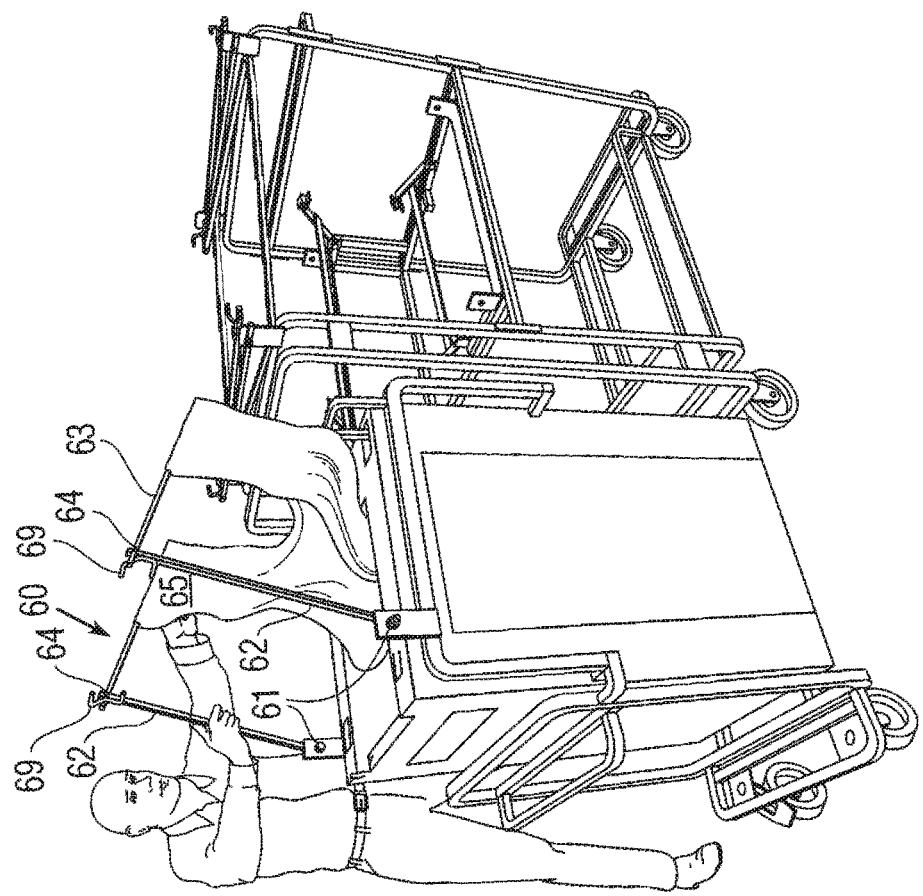
FIGS. 4-7 are sequential perspective views illustrating one of the three deployable privacy mechanisms 60 and its usage.
Figure 4:
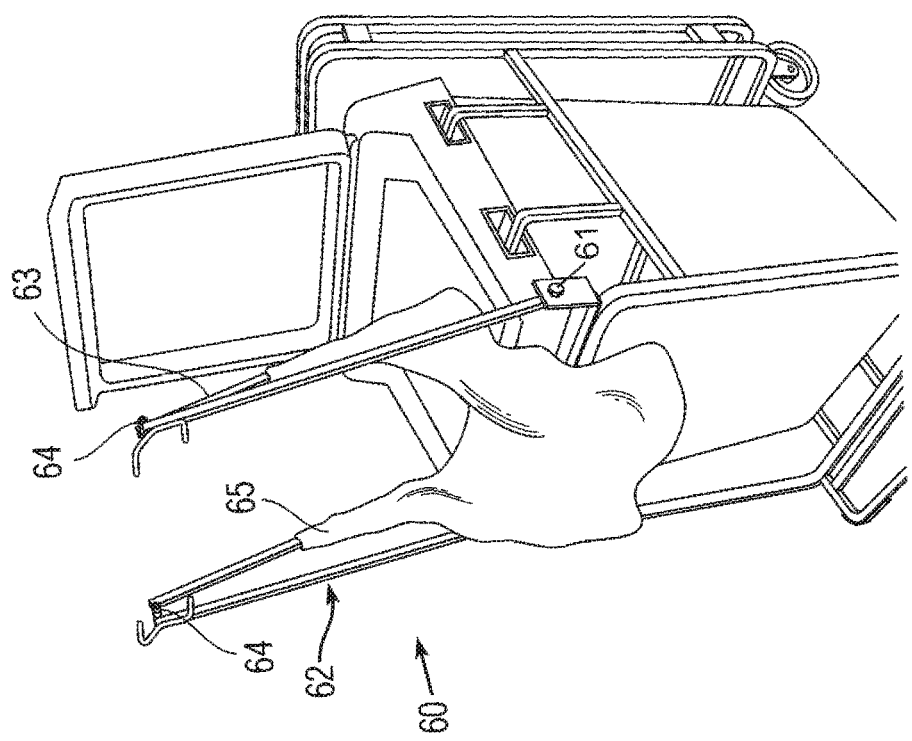

As best seen in FIG. 5, both pivoting arms 62 are equipped with a stop-hook 68 proximate pivot joints 61 to limit outward pivoting. Similarly, the U-shaped curtain support member 63 is equipped with a stop-hook 69 at each distal end proximate pivot joints 64 to limit outward pivoting. Hook 69 also limits rotation of U-shaped curtain support 63 past parallel with member 62 to assure rotation in the proper direction. Stop-hooks 68, 69 may be simple bent-wire-lengths welded to the pivoting arms 62 and U-shaped curtain support member 63, respectively, and bent into the path of travel. Specifically, in the illustrated embodiment stop-hooks 68 hook underneath the corners of the side members 11 and stop pivoting of arms 62 when they are deployed forwardly past vertical, approximately 100 degree from horizontal. Similarly, stop-hooks 69 on U-shaped curtain support member 63 hook underneath pivoting arms 62 when curtain support member 63 are deployed forwardly past the pivoting arms 62, approximately 80 degrees past (see FIG. 7).

Figure 7:
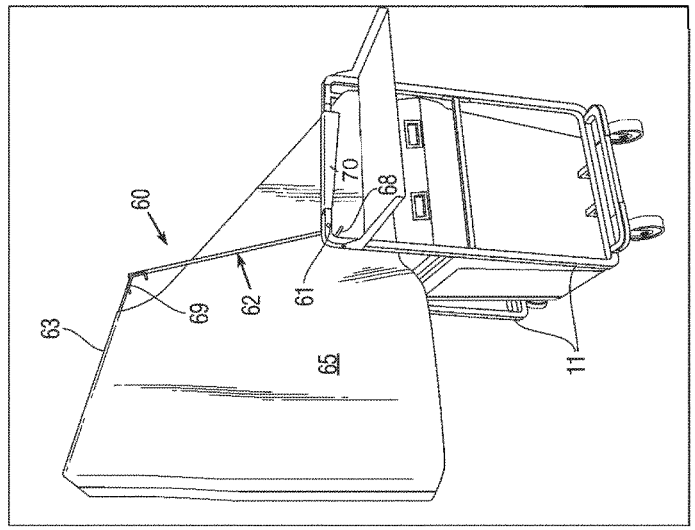
Figure 6:
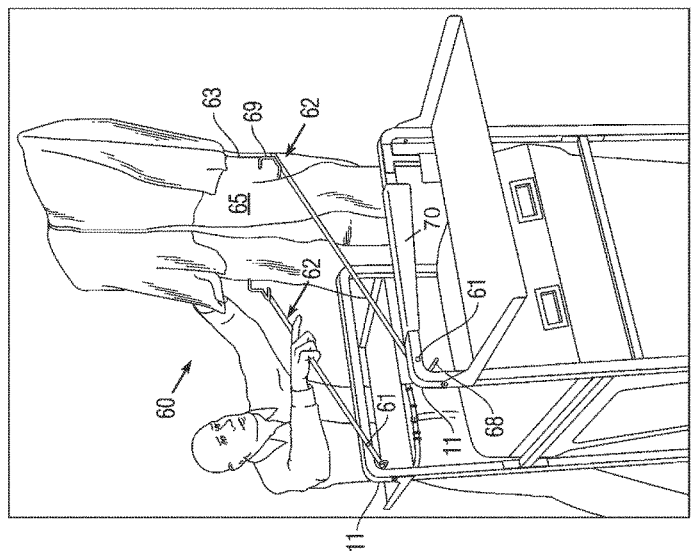

The privacy curtain 65 may be furled around U-shaped curtain support member 63 and easily stowed along with the entire privacy mechanism 60. Conversely, when deployed, the tension of the fabric privacy curtain 65 adds structure to the enclosure (FIG. 7). The privacy curtain 65 is a four-sided sewn structure with two suspending polygonal side-panels, a slitted front panel for easy standup entry, and a top panel. The deployed privacy curtain 65 is wedge-shaped, the top panel being angled downward toward the center/rear of the ballot cart 10, and the sides being substantially horizontal. The wedge is secured to the rear of the ballot cart 10 by hook and loop straps or any other means. The privacy curtain 65 is secured along the length of the U-shaped curtain support member 63, and may be sewn with a peripheral sleeve so that the U-shaped curtain support member 63 can be inserted there through as shown. When the privacy mechanism 60 is forwardly deployed as shown in FIG. 7, the securement to the rear of the ballot cart 10 anchors it and helps to limit forward pivoting. The tension also helps the privacy curtain 65 drape uniformly, which improves the aesthetics. The privacy curtain 65 hangs evenly down at the front for convenient entry through the slitted front panel, and by virtue of the backward tension combined with the spreading action of support member 63 and pivoting arms 62 dewrinkles the privacy curtain 65 and gives it a clean three-dimensional wedge-shaped appearance.

FIG. 8 is a close-up perspective view of the folding bottom shelf 30 and articulating stand assembly 40 at the voting terminal enclosure 14. The folding bottom shelf 30 comprises a U-shaped member 32 occupying approximately half the interior of the voting terminal enclosure 14, and pivoted at both ends midway along the bottom of side member 11 at joints 36. A lateral reinforcing strut 34 provides reinforcement. The U-shaped front of shelf 30 is bent upward in a lip. Given the foregoing configuration, the folding bottom shelf 30 can be folded to a lower shelf position (as shown) for carrying cargo, with the furled upward lip of U-shape member 32 serving as a retaining rail. Alternatively, the folding bottom shelf 30 can be folded back to an upstanding position, completely opening the front of voting, terminal enclosure 14, so that a wheelchair voter can wheel their chair in and vote.

FIG. 8 also shows the articulating stand assembly 40 for adjustable access at the forefront on the voting terminal enclosure 14. Stand assembly 40 generally includes an upwardly turned U-shaped bracket 42 fixedly mounted atop the front/upper cross-strut 27 located at mid-height. A pair of reinforced yoke plates 45 are mounted on each arm of the U-shaped bracket 42 and yoke plates 45 pivotally receive the first voting terminal by a pair of lateral pins. The first voting terminal remains free to pivot thereabout, subject to a forward constraint imposed by delimiter pins 47, and subject to a rearward constrain imposed by arms 44. Thus the first voting terminal is free to pivot to a vertical position indexed by delimiter pins 47 so that it directly faces a wheelchair voter, or can pivot back to a flat horizontal position for transport or for viewing by a standing voter. Arms 44 also pivot either upward to prop the first voting terminal in its vertical position, or downward clear of the first voting terminal so that it can lay back into its flat horizontal position.

The above combination of the folding bottom shelf 30 and articulating stand assembly 40 make the first voting station ADA-compliant inasmuch as it can serve as a wheelchair or standing station.

FIG. 9 is an alternate embodiment of the articulating stand assembly 40 where arms 44 (of FIG. 8) are replaced by an indexed sawtooth-bracket 49 to accommodate voting terminals having a built-in rear stand as shown. The built-in rear stand may be seated in the desired notches of indexed sawtooth-bracket 49 to affix the voting terminal at any desired tilt.

The corners of bumper 70 are preferably fitted with a corner piece 72 made from rubber, plastic, or other flexible material to soften any impact of cart 22 with a wall or other object, including an adjacent cart. This feature advantageously enhances the ability of cart 22 to be easily transported by laypeople such as those who regularly oversee the operation of polling places and organize and transport voting equipment in that carts 22 laden with heavy equipment will not be able to impact each other along the side rail assemblies or optional handle, where the hands of a user are commonly placed to direct the cart's movement. The inability of the carts to impact each other at the level of shelving not only prevents injury to the operator of the cart but also advantageously softens any impact to the equipment itself, especially where delicate computerized voting equipment is being used, in addition, a large volume of voting equipment is commonly stored in a common storage location between election cycles for safekeeping. The rectangular structure and the bumper features of the present invention advantageously make transportation and storage of the voting equipment on the carts themselves simpler and safer in that multiple carts may be "stacked" horizontally in close proximity to one another in a storage facility or on a truck bed wherein occasional jolts to one of the carts being stored or transported does not cause a large impact to be felt by the equipment on an adjacent or nearby cart.

Because the ballot counter/vote tabulator is deployed at waist-level, it is easily accessible to standing or wheelchair voters. And because all the equipment (the ballot counter/vote tabulator and two voting terminals) remains fully accessible while on the cart 10, they need not be off-loaded for voting. During voting or transport, both voting terminals and the ballot box/tabulator are all fully restrained against side-to-side motion and fully attached to the cart 10 for tamper-proof use, and yet there is full frontal access to the control panels and consoles. Moreover the particular design maximizes strength and usability, and yet keeps weight to a minimum with a framework that is as light weight as possible. After voting, the process is reversed and the cart 10 is removed without precinct workers lifting any equipment. Moreover, the present design is modular and can be easily scaled upward to add additional voting terminal enclosures 14 or ballot box enclosures 12 if so desired. Note how the innermost side rail 11 of the voting terminal enclosure 14 (FIG. 1) is affixed to the innermost side rail 11 of the ballot box enclosure 12 by four spacer plates 43 welded between the two side rails 11 proximate the corners. An additional voting terminal enclosure 14 or ballot box enclosure 12 may be added to either end of the car 10 in the same manner. Specifically, so long as the additional voting terminal enclosure 14 or ballot box enclosure 12 is similarly designed with opposing side-rails 11 the side rail 11 of each additional voting or ballot box enclosure 12, 14 may be affixed to the side rail 11 of the depicted cart 10 by four of the same spacer plates 43 welded between the two side rails 11 proximate the corners.

Having, now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth herein.

We claim:

1. A utility cart for transporting a combination of a voting terminal and ballot box, and for parking said ballot box and voting terminal in an accessible position for voter use, respectively, both while still on said cart, comprising:
    a ballot box enclosure for securing said ballot box, said ballot box enclosure comprising,
        a pair of opposing side-rails each defined by at least two vertical struts and at least two lateral struts joined in a contiguous substantially rectangular shape,
        a plurality of castors mounted beneath said side-rails;
        a plurality of transverse struts joining said side rails together at a bottom and sides of said ballot box enclosure for constraining said ballot box therein; and
    a voting terminal enclosure configured to secure a pair of voting terminals one above the other in a diametric relationship, said voting terminal enclosure comprising,
        a pair of opposing side-rails each defined by at least two vertical struts and at least two lateral struts joined in a contiguous substantially rectangular shape,
        a plurality of castors mounted beneath said side-rails;
        a plurality of transverse struts joining said side-rails together at a bottom and sides of said voting terminal enclosure for constraining said at least one voting terminal therein; and
    a plurality of brackets secured to both said ballot box enclosure and said voting terminal enclosure for securing said ballot box enclosure and said voting terminal enclosure together; and
    a plurality of castors secured between adjacent side-rails of said voting terminal enclosure and side-rails of said ballot box enclosure.

2. A utility cart for transporting a combination of a voting terminal and ballot box, and for parking said ballot box and voting terminal in an accessible position for voter use, respectively, both while still on said cart, comprising:
    a ballot box enclosure for securing said ballot box, said ballot box enclosure comprising,
        a pair of opposing side-rails each defined by at least two vertical struts and at least two lateral struts joined in a contiguous substantially rectangular shape,
        a plurality of castors mounted beneath said side-rails;
        a plurality of transverse struts joining said side-rails together at a bottom and sides of said ballot box enclosure for constraining said ballot box therein; and
    a voting terminal enclosure for securing at least one voting terminal, said voting terminal enclosure comprising,
        a pair of opposing side-rails each defined by at least two vertical struts and at least two lateral struts joined in a contiguous substantially rectangular shape,
        a plurality of castors mounted beneath said side-rails,
        a plurality of transverse struts joining said side-rails together at a bottom and sides of said voting terminal enclosure for constraining said at least one voting terminal therein, said voting terminal enclosure being open along a bottom side for wheelchair access;

a plurality of brackets secured to both said ballot box enclosure and said voting terminal enclosure for securing said ballot box enclosure and said voting terminal enclosure to ether; and a plurality of castors secured between adjacent side-rails of said voting terminal enclosure and side-rails of said ballot box enclosure.

3. The utility cart according to claim 1, further comprising a plurality of privacy assemblies, each said privacy assembly further comprising:

an opposing pair of elongate support arms each pivotably attached at one end to said utility cart, a U-shaped support member pivotally attached at each end by a pivot joint to a respective one of said pair of support arms, and a privacy curtain attached to said U-shaped support member, said pair of support arms and said U-shaped support member being pivotable relative to said opposing side-members to thereby suspend said privacy curtain in front of said voting equipment cart substantially surrounding a voter inside a partially enclosed area in front of the voting equipment cart.

4. The utility cart according to claim 3, wherein said stop members index pivoting of said U-shaped support member to a fixed angle relative to said pair of support arms.

5. The utility cart according to claim 3, wherein said plurality of privacy assemblies includes a first privacy assembly pivotable outward over said ballot box enclosure and a second privacy assembly pivotable outward over said voting terminal enclosure.

6. The utility cart according to claim 1, wherein said plurality of privacy assemblies includes a third privacy assembly pivotable outward over said voting terminal enclosure.

7. A utility cart for transporting a combination of a voting terminal and ballot box, and for parking said ballot box and voting terminal in an accessible position for voter use, respectively, both while still on said cart, comprising:

a ballot box enclosure for securing said ballot box, said ballot box enclosure comprising, a pair of opposing side-rails each defined by at least two vertical struts and at least two lateral struts joined in a contiguous substantially rectangular shape, a plurality of castors mounted beneath said side-rails, a plurality of transverse struts joining said side-rails together at a bottom and sides of said ballot box enclosure for constraining said ballot box therein;

a voting terminal enclosure for securing at least one voting terminal, said voting terminal enclosure comprising, a pair of opposing side-rails each defined by at least two vertical struts and at least two lateral struts joined in a contiguous substantially rectangular shape, a plurality of castors mounted beneath said side-rails, a plurality of transverse struts joining said side-rails together at a bottom and sides of said voting terminal enclosure for constraining said at least one voting terminal therein, and a plurality of brackets secured to both said ballot box enclosure and said voting terminal enclosure for securing said ballot box enclosure and said voting terminal enclosure together;

a pair of lower bumpers, each lower bumper including a U-shaped end rail attached to and protruding outward a fixed distance from a respective side-rail; and a plurality of castors secured between adjacent side-rails of said voting terminal enclosure and side-rails of said ballot box enclosure.

8. The utility cart according to claim 7, wherein each of said pair of lower bumpers further comprises a transverse rail straddling the U-shaped end rail.

9. The utility cart according to claim 7, further comprising a pair of upper bumpers at each end, each upper bumper including a U-shaped end rail attached to and protruding outward from a respective side-rail.

10. The utility cart according to claim 9, wherein each said upper protrudes outward from said respective side-rail less than said fixed distance.

11. The utility cart according to claim 1, wherein four of said plurality of castors are attached to said pair of lower bumpers.

12. The utility cart according to claim 1, further comprising an articulating stand assembly pivotally attached inside the voting terminal enclosure for adjustable access at the forefront.

13. The utility cart according to claim 1, further comprising an articulating shelf assembly pivotally attached inside the voting terminal enclosure for adjustable access at the forefront.

14. A utility cart for transporting a combination of a voting terminal and ballot box, and for parking said ballot box and voting terminal in an accessible position for voter use, respectively, both while still on said cart, comprising:

a ballot box enclosure for securing said ballot box, said ballot box enclosure comprising, a air of opposing side-rails each defined by at least two vertical struts and at least two lateral struts joined in a contiguous substantially rectangular shape, a plurality of castors mounted beneath said side-rails, a plurality of transverse struts joining said side-rails together at a bottom and sides of said ballot box enclosure for constraining said ballot box therein; and a voting terminal enclosure for securing at least one voting terminal, said voting terminal enclosure comprising, a pair of opposing side-rails each defined by at least two vertical struts and at least two lateral struts Joined in a contiguous substantially rectangular shape, a plurality of castors mounted beneath said side-rails, a plurality of transverse struts joining said side-rails together at a bottom and sides of said voting terminal enclosure for constraining said at least one voting terminal therein, and a plurality of brackets secured to both said ballot box enclosure and said voting terminal enclosure for securing said ballot box enclosure and said voting terminal enclosure together; and a plurality of castors secured between adjacent side-rails of said voting terminal enclosure and side-rails of said ballot box enclosure;

wherein said utility cart is configured to provide three separate voting stations in a T-configuration.

15. The utility cart according to claim 14, wherein one of said voting stations allows wheelchair access.

* * * * *